Aug. 30, 1955  L. J. BRANDT  2,716,348

VARIABLE-SPEED POWER TRANSMISSION

Filed July 26, 1952  2 Sheets-Sheet 1

INVENTOR.
LEO J. BRANDT
BY
ATTORNEY

Aug. 30, 1955        L. J. BRANDT        2,716,348
VARIABLE-SPEED POWER TRANSMISSION

Filed July 26, 1952        2 Sheets-Sheet 2

INVENTOR.
LEO J. BRANDT
BY
ATTORNEY

United States Patent Office 2,716,348
Patented Aug. 30, 1955

2,716,348
VARIABLE-SPEED POWER TRANSMISSION
Leo J. Brandt, Denver, Colo.
Application July 26, 1952, Serial No. 301,050
1 Claim. (Cl. 74—124)

This invention relates to power transmissions for the application of power manifest in a rotating drive shaft to effect rotation of a driven shaft, and has as an object to provide an improved such transmission characterized by a wide range of selectively-available speed and power ratios between the drive and the driven shafts.

A further object of the invention is to provide a novel and improved power transmission operable to efficiently apply the power manifest in a rotating drive shaft to effect rotation of a driven shaft at variable speed and power ratios relative to the drive shaft.

A further object of the invention is to provide a novel and improved power transmission operable in constant coupling relation between a rotatable drive shaft and a driven shaft to rotate the driven shaft at selectively-variable speeds and with consequently-varied torque relative to the drive shaft.

A further object of the invention is to provide a novel and improved power transmission operable in constant coupling relation between a rotatable drive shaft and a driven shaft to rotate the latter through a variable speed and power range including a null point eliminative of occasion for a clutch to interrupt the drive.

A further object of the invention is to provide a novel and improved power transmission effective in constant coupling relation between a rotatable drive shaft and a driven shaft to apply drive shaft rotation to the driven shaft as successively-repetitious rotational impulses of selectively-variable force and angular amplitude.

A further object of the invention is to provide a novel and improved power transmission that is selectively reversible in the direction of ultimate drive while in constant coupling relation between a rotatable drive shaft and a driven shaft.

A further object of the invention is to provide a novel and improved power transmission adapted to an infinite variety of particular installations and uses, susceptible of practical development in various structural embodiments, that is simple and positive in operation, and efficient in attainment of the ends for which designed.

With the foregoing and other objects in view, my invention consists in the construction, arrangement, and combination of elements as hereinafter set forth, pointed out in my claim, and illustrated by the accompanying drawings, in which—

Figure 1:
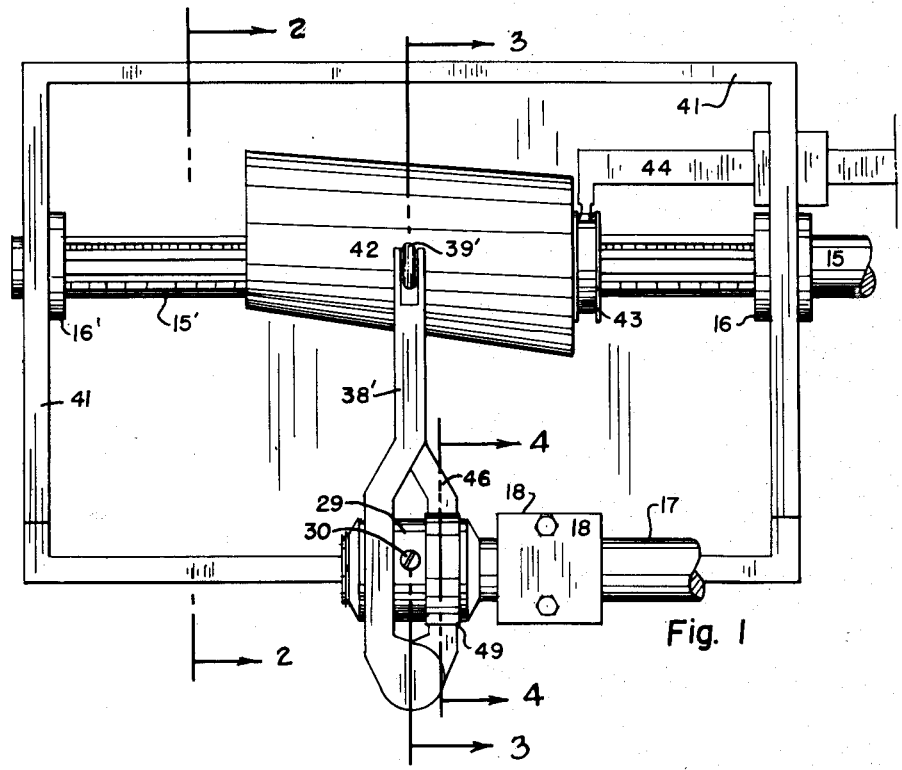
Figure 1 is a top plan view of yet other and more elaborate structure operable to give effect to the principles of the invention.
Figure 2:
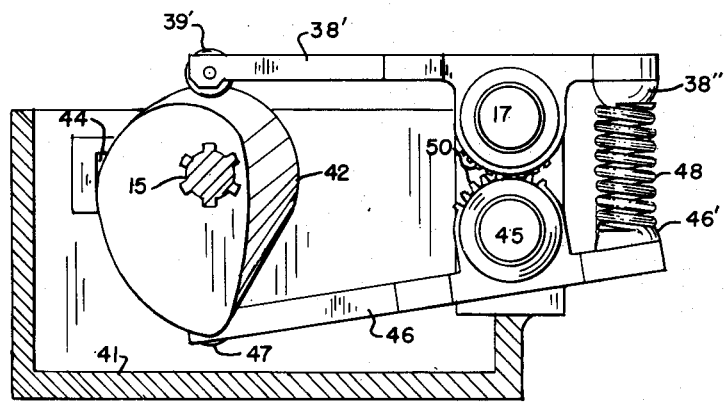
Figure 2 is a cross section taken substantially on the indicated line 2—2 of Figure 1.
Figure 4:
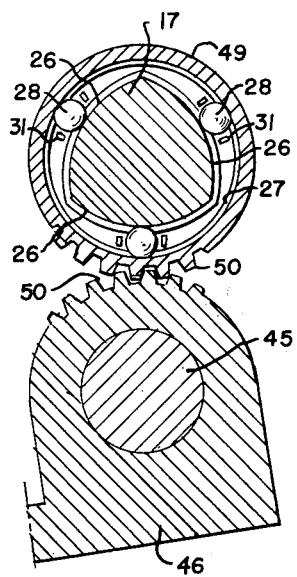
Figure 4 is a fragmentary, detail section, on a relatively enlarged scale, taken substantially on the indicated line 4—4 of Figure 1.
Figure 3:
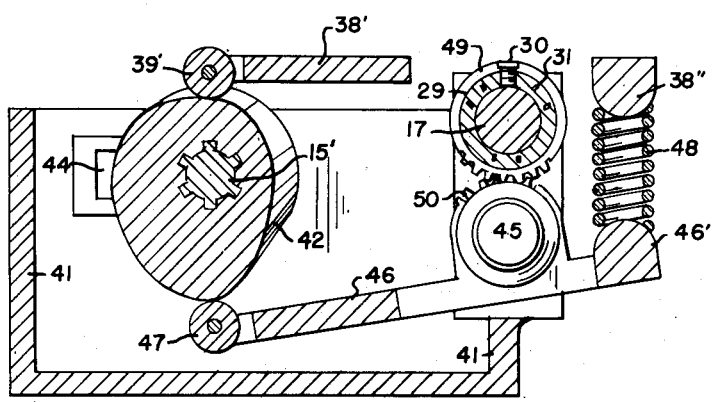
Figure 3 is a cross section taken substantially on the indicated line 3—3 of Figure 1.

In the embodiment of the invention according to Figures 1-4, inclusive, the driven shaft 17 is journaled for rotation in its bearing 18 and the spacedly-parallel drive shaft 15 is formed with a splined length 15' spanning between bearings 16 and 16' fixedly related, as by means of a rigid frame 41, with the bearing 18. A longitudinally-elongated cam block 42, non-uniform as to cross-sectional outline, is feathered to and for shift axially of the drive shaft portion 15', a radially-flanged collar 43 at one end of said cam block in engagement with an end of a control rod 44 shiftably supported by the frame 41 in parallel with the shaft 15 typifying means for selective adjustment of said cam block in either direction longitudinally of the shaft portion 15'. An arm 38' furnished with a roller-type cam follower 39' at its free end is mounted on the shaft 17 for rotational drive of the latter through the agency of the overrunning clutch organization constituted from the shaft cam surfaces 26, race 27, balls 28, collar 29, and spring finger units 31, said arm 38' spanning perpendicularly between the shaft 17 and shaft portion 15' for oscillation about the shaft 17 axis in reaction to travel of its follower 39' about and in maintained engagement with the surface of the rotating cam block 42. Freely pivoted on a stub shaft 45 fixed to the frame 41 in spaced parallelism with and beneath the shaft 17, a second arm 46 furnished with a roller-type cam follower 47 is disposed to span between its shaft mounting and the cam block 42 in opposition to the arm 38' and in maintained engagement of its follower with the surface of said cam block, end portions of the arms 38' and 46 carrying the cam followers being oppositely offset to bring the said followers into track circumferentially of the cam block while accommodating a spacing or displacement of the shaft-engaged arm hubs axially of the shaft 17. The arms 38' and 46 are extended beyond their shaft mountings in a direction away from the cam block 42 to support opposed, crowned bosses, 38" 46', respectively, with their axes aligned in the same plane radially of the shaft 17, between which bosses an expansive coil spring 48 engages to at all times maintain the arm followers 39' and 47 in rolling engagement with the cam block 42 surface. A second overrunning clutch comprised from shaft cam surfaces 26, race 27, and balls 28, is represented by the numeral 49 and is associated with the shaft 17 at the side of the collar 29 opposite to the arm 38' hub position for completion through cooperation with the spring finger units 31 projecting from the corresponding side of said collar, thus to relate said collar for adjustment angularly of the shaft 17 in like, simultaneous controlling relation with the direction of clutching action characterizing the overrunning clutches on either side thereof. The clutch 49 is registered radially of the shaft 17 with the hub of the arm 46 with the periphery of its race member substantially tangent and radially equal to the periphery of said hub, so that gear teeth 50 formed on opposed arcs of said race member and hub are in constant mesh effective to reflect pivotal travel of the arm 46 hub about its shaft 45 as corresponding, but opposite, pivotal travel of the clutch 49 race member about the axis of the shaft 17; which pivotal travel of the clutch 49 race member is applied to the shaft 17 through the clutch assembly of which it is a part to supplement and continue the drive of said shaft transmitted through the clutch mounting of the arm 28' as directionally determined by the setting of the clutch collar 29 angularly of said shaft. As illustrated, the surface of the cam block 42 is contoured from a circle of zero eccentricity relative to the shaft 15' portion at one of the block ends to a lobed outline, similar to that of the cam 37, of maximum eccentricity at its other end, thus to reflect shift of said cam block axially of the shaft portion 15' and relative to the axially-fixed positions of the arms 38' and 46 as a control effective to vary the amplitude of arm oscillation through a range from zero and to the maximum for which the apparatus is designed, and to consequently vary the speed and power input factors of the resulting shaft 17 drive through means selectively manipulable while the apparatus is operating; adjustment of the collar 29 angularly of the shaft 17 being effective when the apparatus is at rest to apply the arm oscillations for drive of said shaft in either direction of its rotation.

Since changes, variations, and modifications in the form, construction, and arrangement of the elements shown and described may be had without departing from the spirit of my invention, I wish to be understood as being limited solely by the scope of the appended claim, rather than by any details of the illustrative showing and foregoing description.

I claim as my invention:

In a power transmission having a rotatably-powered drive shaft and a driven shaft journaled for rotation in spaced parallelism with said drive shaft, an elongated cam peripherally contoured from zero eccentricity at one end to maximum eccentricity at its other end on, rotatable with, and shiftable axially of said drive shaft, means manually actuable in engagement with said cam to shift and to position the latter axially of the drive shaft, an arm revolubly journaled adjacent one end on said driven shaft to span perpendicular to and between the drive and driven shafts, a follower on the end of said arm adjacent the drive shaft disposed to track on said cam, an extension of said arm beyond its mounting on the driven shaft and away from the drive shaft, a second arm journaled for oscillation about an axis spacedly adjacent and parallel to the driven shaft to span perpendicular to and between said axis and the drive shaft on the side of the latter opposite to said first arm, a follower on the end of said second arm adjacent the drive shaft disposed to track on said cam in the same plane radially of the drive shaft as the follower of the first arm, an extension of said second arm away from the drive shaft spacedly registered in a common plane radially of the driven shaft with the extension of said first arm, an expansive coil spring end-engaged with and operatively between outer ends of said extensions to yieldably urge both said followers into engagement with the cam, a reversible, overrunning clutch operatively coupling the journal of said first arm and said driven shaft, a duplicate overrunning clutch characterized by a race on said driven shaft adjacent said first clutch and in registration radially of the driven shaft with the journal of the second arm, intermeshing gear teeth on said race and the journal of the second arm, and means on the driven shaft between and similarly engaging said clutches selectively adjustable angularly about the shaft to simultaneously determine and to optionally reverse the direction of drive effect of both said clutches.

References Cited in the file of this patent

UNITED STATES PATENTS

| | | |
|---|---|---|
| 561,260 | Grimme | June 2, 1896 |
| 678,364 | Heymann | July 16, 1901 |
| 687,566 | Johnson | Nov. 26, 1901 |
| 725,551 | Gentry | Apr. 14, 1903 |
| 899,420 | Michaud | Sept. 22, 1908 |
| 1,136,821 | Loomis | Apr. 20, 1915 |
| 1,291,642 | Elwell | Jan. 14, 1919 |
| 1,397,819 | Munters | Nov. 22, 1921 |
| 1,489,014 | Shellenberger | Apr. 1, 1924 |
| 1,927,046 | Powell | Sept. 19, 1933 |
| 2,404,231 | Harper | July 16, 1946 |
| 2,554,463 | Klamp | May 22, 1951 |

FOREIGN PATENTS

| | | |
|---|---|---|
| 329,739 | Italy | Sept. 19, 1935 |
| 412,364 | Italy | Nov. 27, 1945 |